(12) United States Patent
Perry

(10) Patent No.: US 9,635,424 B2
(45) Date of Patent: Apr. 25, 2017

(54) VIRTUAL HIGH DEFINITION VIDEO PLAYER

(71) Applicant: SONY INTERACTIVE ENTERTAINMENT AMERICA LLC, San Mateo, CA (US)

(72) Inventor: David Perry, Monarch Beach, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 14/335,793

(22) Filed: Jul. 18, 2014

(65) Prior Publication Data

US 2016/0021429 A1    Jan. 21, 2016

(51) Int. Cl.
| | |
|---|---|
| H04N 7/173 | (2011.01) |
| H04N 21/4722 | (2011.01) |
| H04N 21/218 | (2011.01) |
| H04N 21/235 | (2011.01) |
| H04N 21/472 | (2011.01) |
| H04N 21/2343 | (2011.01) |

(Continued)

(52) U.S. Cl.
CPC ..... *H04N 21/4722* (2013.01); *H04N 21/2181* (2013.01); *H04N 21/235* (2013.01); *H04N 21/2343* (2013.01); *H04N 21/435* (2013.01); *H04N 21/47202* (2013.01); *H04N 21/6587* (2013.01)

(58) Field of Classification Search
CPC .......... H04N 7/17336; H04N 7/17318; H04N 7/165; H04N 21/4722; H04N 21/2181; H04N 21/2343; H04N 21/235; H04N 21/435; H04N 21/47202; H04N 21/6587

USPC ........ 725/37, 87, 91–93, 104, 114, 116, 138
See application file for complete search history.

(56) References Cited

U.S. PATENT DOCUMENTS

| | | | |
|---|---|---|---|
| 6,859,312 B1 * | 2/2005 | Atchison | G02B 21/30 359/363 |
| 2003/0068098 A1 * | 4/2003 | Rondinelli | G06T 3/0062 382/276 |

(Continued)

FOREIGN PATENT DOCUMENTS

| | | |
|---|---|---|
| TW | 201349848 | 12/2013 |
| WO | WO 2016/010736 | 1/2016 |

OTHER PUBLICATIONS

PCT Application No. PCT/US2015/038836 International Search Report and Written Opinion mailed Sep. 11, 2015.

(Continued)

*Primary Examiner* — Oleg Asanbayev
(74) *Attorney, Agent, or Firm* — Polsinelli LLP

(57) ABSTRACT

A video service is provided by one or more servers which communicate directly with one more clients over a network. The service may provide digital optical disc data storage formatted video, such as for example a Blu-ray format video, and allows Blu-ray video to be streamed to a client device over the network. The system may utilize direct and fast content delivery of content typically found on a high definition digital optical disc. The content may include a movie as well as featurettes and other content. The video service may also include augmented content and may provide overlay content. In addition to these features, the video streaming service may also provide community content as an overlay to improve a user's viewing experience.

16 Claims, 3 Drawing Sheets

(51) Int. Cl.
*H04N 21/435* (2011.01)
*H04N 21/6587* (2011.01)

(56) References Cited

U.S. PATENT DOCUMENTS

| | | | |
|---|---|---|---|
| 2003/0106065 A1* | 6/2003 | Sakai | H04N 7/165 725/91 |
| 2005/0066339 A1* | 3/2005 | Thoen | H04N 21/234309 719/328 |
| 2006/0127059 A1 | 6/2006 | Fanning | |
| 2007/0028288 A1 | 2/2007 | Sigmon et al. | |
| 2007/0177495 A1* | 8/2007 | Ametsitsi | H04L 12/4625 370/208 |
| 2007/0271301 A1 | 11/2007 | Klive | |
| 2008/0184132 A1* | 7/2008 | Zato | G06Q 30/02 715/748 |
| 2012/0174157 A1* | 7/2012 | Stinson, III | H04N 5/44543 725/40 |
| 2012/0302343 A1 | 11/2012 | Hurst et al. | |
| 2013/0227598 A1* | 8/2013 | Srinivasan | G06Q 30/018 725/14 |

OTHER PUBLICATIONS

Taiwan Patent Application No. 104123299 Office Action mailed Apr. 6, 2016.
Taiwan Patent Application No. 104123299 Office Action mailed Jul. 29, 2016.

* cited by examiner

VIRTUAL HIGH DEFINITION VIDEO PLAYER

BACKGROUND

Field of the Invention

The present invention relates to streaming of digital media. In particular, the present invention relates to streaming of video content from a disk player and other sources.

Related Art

As transmission speed and capacity for networks increases, more applications and data are provided over those networks. For example, companies provide streaming video over the Internet. The video content may include a movie transmitted directly to a client device. Additional content such as commentary and featurettes which may be included on a physical DVD disc or Blu-ray disc are typically not transmitted or made available by the service providers—only the movie itself. Additionally, the videos are usually provided via a data stream that can only be watched in sequence. Video stream providers do not allow a user to view any part of the video they wish without any delay, especially when the video is a high definition video. Rather, previous solutions pre-buffer portions of a video to allow only the pre-buffered portion to be provided to the customer.

What is needed is an improved method for providing a high definition video to a client over a network.

SUMMARY

The present system provides a virtual high definition video service over a network. The service may be provided by one or more servers that may each directly connect with and provide content to one or more clients. The service may provide digital optical disc data storage formatted video, such as for example a Blu-ray, DVD, laser disk, CD, 3D, 4 k, and 8K format video. The system may allow video to be streamed to a client device over the network. The system may utilize direct and fast content delivery of content typically found on a high definition digital optical disc such as for example a Blu-ray or DVD disc. The content may include a movie as well as featurettes and other content typically found on such disks. The video service may also include augmented content and may provide overlay content. In addition to these features, the video streaming service may also provide community content as an overlay to improve a user's viewing experience.

In an embodiment, a system for providing video content over a network may include a high definition video player and a server. The high definition video player outputs frames of high definition video content. The server may receive the high definition video content from the high definition video player and transmit each frame of the high definition video content to a client over a network.

DETAILED DESCRIPTION

The present system includes one or more servers that provide a video service over a network. The video service may provide digital optical disc data storage formatted video such as Blu-ray, DVD, laser disk, CD, 3D, 4 k, and 8K format video. The system may allow video to be streamed to a client device directly from a server over the network. The system may utilize direct and fast content delivery of content typically found on a digital optical disc such as a Blu-ray disc or DVD disk. The content may include a movie as well as featurettes and other content typically found on such disks. The video service may also include augmented content and may provide overlay content. In addition to these features, the video streaming service may also provide community content as an overlay to improve a user's viewing experience.

The present system allows a user to provide input to control playback of digital video at a client device such that the control input is ultimately received and implemented at a server. The user may effectively fast forward, rewind, skip to other parts of a movie, access other content, and experience other content provided by the server by providing input at a client device. The server may include one or more video players such as Blu-ray, DVD, laser disk, CD, 3D, 4 k, 8 k and other disc players. The video output by the server's video player is transmitted to the user frame process by frame process over a high speed network. In some instances, only changes between frames are transmitted to a client device by the server. By providing the video output process frame by process frame, there is no need to stream and cache video data, and any latency associated with allowing a data stream to load in time for viewing are avoided.

Figure 1:
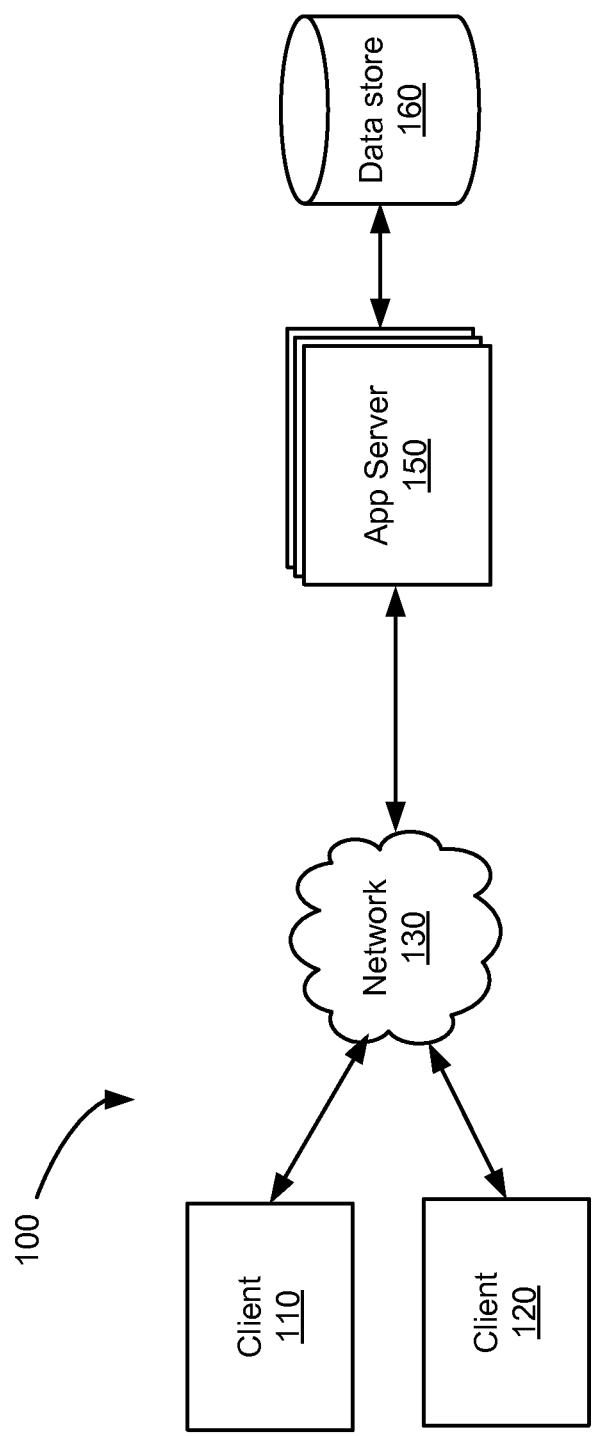
FIG. 1 is a block diagram of a system for providing a virtual Blu-ray experience to a user over a network.

FIG. 1 is a block diagram of a system for providing a virtual Blu-ray experience to a user over a network. The system of FIG. 1 includes client 110, client 120, and application server 150. Clients 110 and 120 may include devices which are suitable for receiving a high definition data stream from application server 150. Client 110 may be implemented as a mobile device, a gaming console, a computer device, or some other device suitable for receiving high definition data such as video frames.

Clients 110 and 120 may communicate with application server 150 over network 130. Network 130 may include a private network, a public network, a local area network, a wide area network, a cellular network, an intranet, the internet, and a combination of these networks. In some embodiments, the network 130 may be suitable to provide video frames output from the a high definition video disc player fast enough to avoid any lag at the client device.

Application server 150 may communicate with clients directly over network 130. Application server 140 may receive data and requests from one or more clients via network 130 process those requests, and provide video and other content directly to one or more of clients 110-120. In some embodiments, application server 150 may include a network server that processes requests received over network 130.

Application server 150 may include one or more machines for providing a video experience, such as a Blue Ray or DVD video experience, directly to one or more clients over a network 130. The servers may be implemented "in the cloud" and may be streamed to client devices 110 and 120. The servers provide direct and fast content delivery to each client. For example, a user may provide input at client 110 to get instant access to any frame in a high definition video such. To achieve this, application server 150 may provide frame process by frame process transmission from the video player "in the cloud" to the client device receiving the frame process by frame process transmission. More information for application server 150 is discussed with respect to FIG. 2.

Data store 160 may store data which is accessed, stored, and processed by application server 150. Data store 160 may include data such as Blu-ray video content, featurettes and other content commonly found on Blu-ray discs, menu content for a Blu-ray disc, related interviews, articles, news, video games, media, soundtrack and other audio, and other data associated with a movie, actors within a movie, or otherwise associated with one or more movies stored at data store 160, contacts and account information for a user associated with the service provided by application server 150, and other data.

Data store 160 may include physical media such as blue ray discs, DVD discs, laser disks, CD disks, and other optical media discs suitable for playback on a corresponding disk player. The physical media may collectively form an optical disk "jukebox in the cloud" such that a user may provide input from a client device to access one or more disks from the collection of disks, and the content may be streamed to the user's client device. In some instances, content from more than one disk may be provided simultaneously directly to the user client device.

Figure 2:
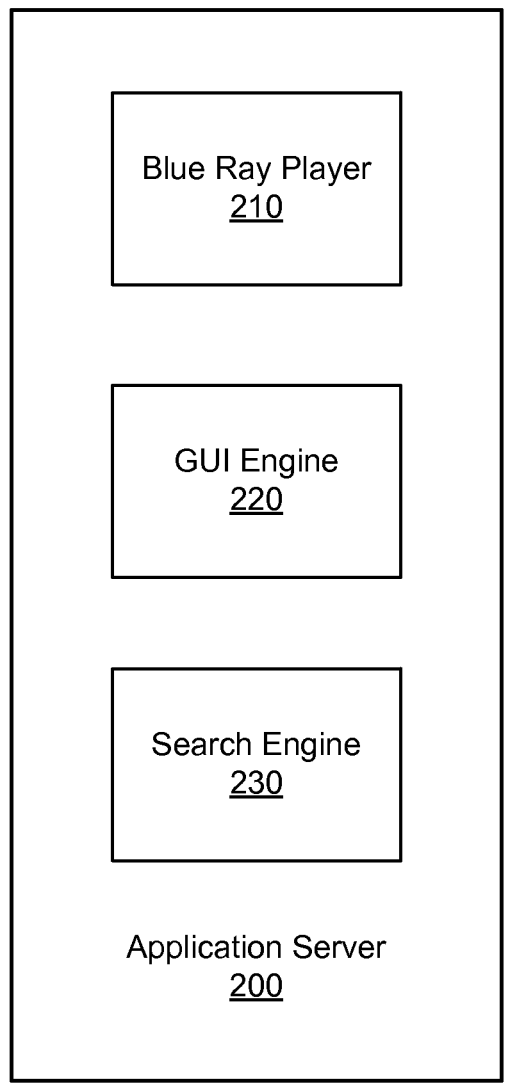
FIG. 2 is a block diagram of an application server.

FIG. 2 provides a block diagram of an application server. The application server 200 of FIG. 2 includes Blu-ray player 210, graphical user interface engine 220, and search engine 230. Though only a Blu-ray player is illustrated in FIG. 2, it is intended that other video players may be used.

Blu-ray player 210 may provide Blu-ray file playback as controlled by a client device. Search engine 230 may retrieve other content over one or more networks such as the internet, such as related interviews, articles, news, video games, media, soundtrack and other audio, and other data and store that data at data store 160. The graphical user interface engine may construct frames of the transmission provided by Blu-ray player 210 and transmit each of those frames over network 130 to client 110.

The service provided by an application server of the present invention may provide augmented content in addition to the typical content found on a Blu-ray disc. The augmented content may be streamed to include Blu-ray disc featurettes, menu content and other data. The stream content may also include content pulled from other sources than the Blu-ray disc, such as related interviews, articles, news and other information.

Smart content may be overlaid within a graphical user interface provided by the application server to a client. The smart content overlay may allow multiple perspective views. For example, video streams captured with multiple cameras can be viewed by a user individually, such as for example when a user changes a current stream through input received by client 110. In some embodiments, the client 110 may be implemented as a virtual reality headset and the video streams may be changed by the user through the virtual reality headset input. A user may position frames at different locations locally through the virtual reality headset. For example, a user may provide a customized contact interface around a main screen viewable through the virtual reality headset. Setting configurations may be linked and saved to the user's profile, such as subtitle and letter box format preferences and other settings. The setting configurations may be particular to a particular Blu-ray disc, a client device, the user, or set to be associated in some other way.

Community content may also be overlaid for the user as provided by application server 150. For example, community content may include chat features, synchronized viewing, crowd source translation, and commentary. The chat feature may be provided with one or more contacts associated with a user viewing content. The chat feature may allow for a user to chat with one or more users while viewing a particular video. Similarly, viewing of content may be synchronized with one or more other users while viewing a video. The synchronized viewing of content with one or more of the user's contacts may allow interaction with the contacts during the synchronized viewing of the video. The interaction may be triggered using local motion detection, audio detection, or some other input by the client device 110. Real time crowd sourced movie and audio translation may also be provided for the movie and/or community content associated with the video. Commentary and sharing may also be provided in real time.

Figure 3:
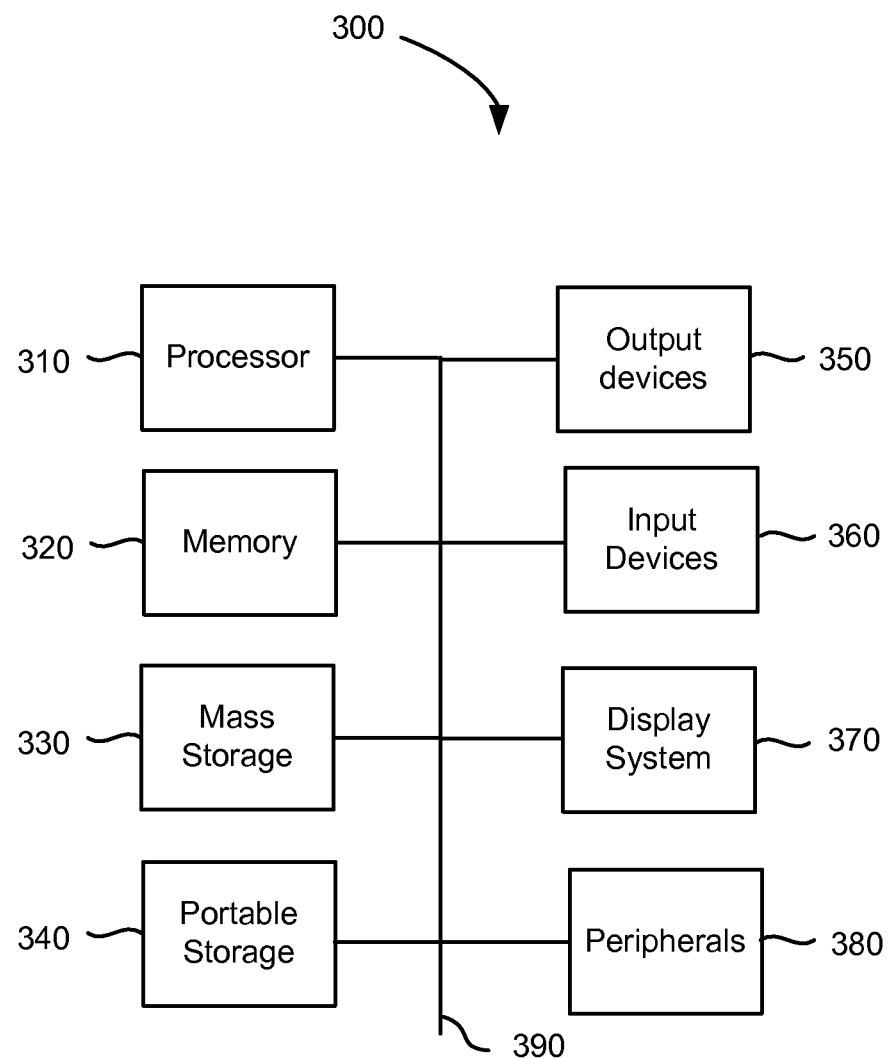
FIG. 3 is a block diagram of a computing environment for use with the present technology.

FIG. 3 is a block diagram of a computing environment. System 300 of FIG. 3 may be implemented in the contexts of the likes of clients 110 and 120, network server 140, application server 150, and data store 160. The computing system 300 of FIG. 3 includes one or more processors 310 and memory 320. Main memory 320 stores, in part, instructions and data for execution by processor 310. Main memory 320 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk or Digital video disc, to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. When implemented as a mobile device, the system 300 may include components typical to such devices such as antennas and radios, microphones, LED touch screens, cameras, and other components.

The computer can also include different bus configurations, networked platforms, multi-processor platforms, etc. Various operating systems can be used including Unix, Linux, Windows, Macintosh OS, Android OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A system for providing video content over a network, the system comprising:
   a client device that includes a video player, wherein the video player receives video content from an application server and outputs frames of the video content for a user to view, and wherein the video player also receives overlay content from the application server to display over the video content for the user to view; and
   an application server that:
   receives user input from the client device, the received user input concerning video content to be displayed on the video player,
   retrieves video content from memory to be processed, wherein the retrieved video content is based on a high-definition video player associated with the client device and the user input,
   processes the retrieved video content based on the high-definition video player associated with the client device and the user input, wherein the process is performed on the video content on a frame-by-frame basis,
   augments the processed content by incorporating additional content obtained from a plurality of sources, the additional content being related to the processed video content; and
   transmits at least one frame of the augmented video content to the client device over the network when the at least one frame is changed in comparison to a preceding frame, wherein unchanged frames are not transmitted to the client device, wherein transmission of the augmented video content to one or more other client devices over the network is performed on a frame-by-frame basis, wherein the one or more other client devices facilitate other users to view the augmented video content in a synchronized manner alongside the user, and wherein the synchronized viewing of the processed video content by the user and by the other users also includes sharing commentary between the user and other users via a chat.

2. The system of claim 1, wherein the video player is a Blu-ray player or DVD player.

3. The system of claim 1, further comprising a data store, wherein the data store stores additional video content related to the high-definition video content processed based on the high-definition video player, wherein the application server receives the additional video content and transmits the additional video content to the client device.

4. The system of claim 3, wherein the data store includes user setting data, and wherein the transmission of the high-definition video content is formatted based on the user setting data.

5. The system of claim 1, wherein the application server provides multiple perspective views of the high-definition video content processed based on the high-definition video player.

6. The system of claim 1, wherein the server providing the high-definition video content based on input received over the network from a virtual reality headset.

7. The system of claim 1, wherein the application server provides a synchronized transmission of the high-definition video content to the client device and at least one of the other client devices on the frame-by-frame basis.

8. The system of claim 1, wherein the overlay content includes chat features, synchronized viewing, crowd source translations, or commentary.

9. The system of claim 1, wherein the overlay content displayed over the video content for the user to view is customizable by the user, and wherein the customization allows the user to specify where the overlay content is positioned with respect to the video content.

10. A method for providing video content over a network, the method comprising:
    receiving user input from a client device, wherein the client device includes a video player, wherein the received user input concerns video content to be displayed on the video player, and wherein the video content includes overlay content,
    executing instructions stored in memory, the execution of the instructions by a processor:
    retrieves video content from memory to be processed, wherein the retrieved video content is based on a high-definition video player associated with the client device and the user input,
    processes the retrieved video content based on the video player associated with the client device and the user input, wherein the process is performed on the video content on a frame-by-frame basis,
    augments the processed content by incorporating additional content obtained from a plurality of sources, wherein the additional content is related to the processed video content, and
    transmits at least one frame of the augmented video content to the client device over a network when the at least one frame is changed in comparison to a preceding frame, wherein unchanged frames are not transmitted to the client device, wherein transmission of the augmented video content to the one or more other client devices over the network is performed on a frame-by-frame basis, wherein the one or more other client devices facilitate other users to view the augmented video content in a synchronized manner alongside the user, and wherein the synchronized viewing of the processed video content by the user and by the other users also includes sharing commentary between the user and other users via a chat.

11. The method of claim 10, further comprising storing additional video content related to the high-definition video content processed based on the high-definition video player, wherein the additional content is received by the application server and transmitted to the client device.

12. The method of claim 11, wherein the stored additional content includes user setting data, and wherein transmission of the high-definition video content format is formatted based on the user setting data.

13. The method of claim 10, wherein the high-definition video content processed from the high-definition video player includes multiple perspective views.

14. The method of claim 10, wherein the user input regarding the high-definition video content is received from a virtual reality headset.

15. The method of claim 10, wherein a synchronized transmission of the high-definition video content to the client device and a second client device is provided on a frame-by-frame basis.

16. A computer readable non-transitory storage medium having embodied thereon a program, the program being executable by a processor to perform a method for providing video content over a network, the method comprising:

receiving user input from a client device, wherein the client device includes a video player, wherein the received user input concerns video content to be displayed on a video player, and wherein the video content includes overlay content;

retrieving video content from memory to be processed, wherein the retrieved video content is based on a high-definition video player associated with the client device and the user input;

processing the retrieved video content based on the video player associated with the client device and the user input, wherein the process is performed on the video content on a frame-by-frame basis;

augmenting the processed content by incorporating additional content obtained from a plurality of sources, wherein the additional content is related to the processed video content; and transmitting at least one frame of the augmented video content to the client device when the at least one frame is changed in comparison to a preceding frame, wherein unchanged frames are not transmitted to the client device, wherein transmission of the augmented video content to one or more other client devices over the network is performed on a frame-by-frame basis, wherein the one or more other client devices facilitate other users to view the augmented video content in a synchronized manner alongside the user, and wherein the synchronized viewing of the processed video content by the user and by the other users also includes sharing commentary between the user and other users via a chat.

* * * * *